May 15, 1923.

C. W. DEUTER 1,455,083

GAUGE FOR PISTON VALVE CYLINDERS

Filed Aug. 2, 1922

Inventor
Charles W. Deuter
By W. L. & S. L. Reynolds
Attorneys

Patented May 15, 1923.

1,455,083

UNITED STATES PATENT OFFICE.

CHARLES W. DEUTER, OF SEATTLE, WASHINGTON.

GAUGE FOR PISTON-VALVE CYLINDERS.

Application filed August 2, 1922. Serial No. 579,270.

*To all whom it may concern:*

Be it known that I, CHARLES W. DEUTER, a citizen of the United States of America, and resident of the city of Seattle, in the county of King and State of Washington, have invented certain new and useful Improvements in Gauges for Piston-Valve Cylinders, of which the following is a specification.

My invention relates to gauges and particularly to a gauge which is intended for measuring the steam ports of a piston valve engine.

In order to adjust piston valves of steam engines to give the proper lead, it has heretofore been necessary to take a stick substantially the length of the valve cylinder and to proceed by a method of laboriously marking off each individual distance thereon. This stick has then been compared with a valve stick prepared from the valve itself, or with the valve which has been removed, and by such means the valve is adjusted until it has been given the proper lead.

The object of my invention is to enable an engineer to make such measurements rapidly and in one operation, and this without inserting his hand into the valve cylinder, which may be quite hot at the time it is desired to make the adjustment.

A further object is the provision of such gauging means which can be attached to an ordinary steel rule or the like, using the steel rule as the gauge stick and thus securing the readings of the spacing of the valve ports directly upon the rule.

A further object is to provide such a device which shall be simple and convenient in operation and cheap to manufacture.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is an elevation of my device in use, the valve cylinder being shown in section.

Figure 2 is a section on line 2—2 of Figure 1.

Figure 3 is a section on line 3—3 of Figure 1.

While the gauge stick may be of any form desired, the ordinary steel rule offers a convenient and accurately marked gauge stick upon which my gauging device may be attached. I have shown the steel rule at 1, provided with the usual groove 11 in one face thereof. This may be of any length desired.

Upon the rule 1 adjacent opposite ends I secure a head piece 2 and a tail piece 20, the two being of like construction. These are formed as bifurcated blocks, the rule 1 being received in the bifurcation. As these pieces are slidable upon the rule, and must be spaced apart a given distance, depending upon screws 4 journaled therein, suitable means are provided for clamping these head and tail pieces upon the rule. The clamping means shown comprise a bolt 3 having a key 30 engaging the groove 11 of the rule and projecting through a bore 21 in the head or tail piece 2 or 20, as the case may be. The bolt 3 is threaded outside of the bore 21 and a nut 32 is threaded thereon. The head or tail piece would be clamped between the nut 32 and the key 30. Other suitable means may be employed, inasmuch as the particular means forms no part of this invention.

Means are provided in the head and tail pieces in which are journaled the screws 4, which extend substantially parallel the rule 1 but within the confines of its edges. These journals I have shown at 22. Gauge fingers 5 are provided, being arranged in pairs and each having a nut 54 within which one of the screws 4 is threaded. A screw 4 is provided for each nut 54.

The gauge fingers are slidable upon the rule and to this end they are formed with an aperture 51 to receive the rule 1. These are not intended to be clamped in place but are held only by the screws 4. The nuts 54 carried upon the individual fingers 5 project laterally therefrom, and preferably the nuts of each pair of fingers project upon one side of the rule 1 and those of the other pair project at opposite sides of the rule, two such pairs of fingers being provided.

Outwardly of the head piece 2 the screws 4 are provided with means for engaging them to turn them. I have shown the wedge shaped squared ends 42 thereon, these being engageable by a suitable wrench, whereby the screws may be rotated to slide the fingers 5 longitudinally upon the rule 1.

A fifth gauge finger 6 may be provided, this being of the general form of the fingers 5 but provided with a bolt 33 and nut 35 similar to the bolts 3 and nut 32, by means of which it may be clamped in place upon the rule 1.

When the piston valve has been removed from its cylinder the rule, with the gauge fingers and the head and tail piece secured thereon in the relation shown in Figure 1, is inserted into the cylinder and moved thereinto until the end of the rule 1 touches the farther end of the cylinder. The pair of gauge fingers 5 nearest the tail piece is then manipulated by means of screws 4 threaded therein until they touch respectively opposite sides of the first port P. The other pair of gauge fingers 5 is then manipulated until they engage similarly the second port P'. The gauge finger 6 is then slid by hand until it engages the end of the cylinder, and it is then clamped in place. The entire gauge may then be slid laterally from engagement with the ports P and P' and the end of the cylinder, and removed from the cylinder. This is used then to lay off a valve stick as in the ordinary practice, or the gauge as set is itself employed as the valve stick. In this manner the reading and gauging is quickly and easily done, without the necessity of the engineer inserting his hand into the cylinder.

What I claim as my invention is:

1. In a gauge for the purpose specified, a gauge stick, a plurality of gauge fingers slidable thereon, and each including a nut, a screw for the nut of each of said gauge fingers extending alongside the gauge stick, means supporting said screws from said gauge stick for rotation, and means whereby said screws may be engaged for rotation adjacent the end of the gauge stick.

2. A gauging attachment for steel rules and the like comprising a head-piece and a tail-piece adapted to be secured upon the steel rule, and each having a plurality of bearings, a plurality of gauge fingers slidable upon the steel rule, and each including a nut, and a screw threaded in each of said nuts, and rotatable in the bearings of the head-piece and tail-piece, respectively, to move said gauge fingers along the rule.

3. A gauging attachment for steel rules and the like comprising a head-piece and a tail-piece adapted to be secured upon the steel rule, and each having a plurality of bearings, a plurality of gauge fingers slidable upon the steel rule, and each including a nut, a screw threaded in each of said nuts, and rotatable in the bearings of the head-piece and tail-piece, respectively, to move said gauge fingers along the rule, and a gauge finger slidable and securable upon said rule independently of said screws.

4. In combination with a gauge stick, two pairs of gauge fingers slidable thereon, a head-piece and a tail-piece securable thereon outside of the gauge fingers, two pairs of screws journaled in said head-piece and tail-piece, and a nut upon each of said gauge fingers engageable with its respective one of said screws, said nuts projecting at opposite sides of the gauge stick for the different pairs of fingers.

5. In combination with a steel rule or the like, a head-piece and a tail-piece, means upon each thereof for clamping it upon the rule, gauge fingers apertured to be received upon the rule, and slidable thereon between the head piece and tail-piece, a nut forming part of each finger, and projecting from a side thereof within the edges of the rule, a screw threaded in each of said nuts and journaled in the head-piece and tail-piece, and means upon said screws outside of the head-piece engageable for rotating the screw.

Signed at Seattle, King County, Washington, this 27th day of July, 1922.

CHARLES W. DEUTER.